United States Patent [19]

Biller et al.

[11] 4,440,305
[45] Apr. 3, 1984

[54] CARRIAGE FOR CABLE LOGGING SYSTEM

[75] Inventors: Cleveland J. Biller, Morgantown; David D. Johnson, Booth, both of W. Va.

[73] Assignee: The United States of America as represented by the Secretary of Agriculture, Washington, D.C.

[21] Appl. No.: 441,198

[22] Filed: Nov. 12, 1982

Related U.S. Application Data

[63] Continuation-in-part of Ser. No. 210,460, Nov. 25, 1980, abandoned.

[51] Int. Cl.³ .............................................. B66C 21/00
[52] U.S. Cl. ...................................... 212/90; 104/87; 104/115
[58] Field of Search ....................... 212/76, 78, 87, 88, 212/90, 91, 93, 94, 117–121; 104/87, 112, 115, 116, 173

[56] References Cited

U.S. PATENT DOCUMENTS

| | | | |
|---|---|---|---|
| 411,584 | 9/1889 | DeCamp | 104/115 |
| 1,222,007 | 4/1917 | McGuire | 104/115 |
| 2,140,585 | 12/1938 | Johansen et al. | 104/87 |
| 3,712,478 | 1/1973 | Rennie et al. | 212/90 X |
| 4,347,938 | 9/1982 | Gorsh | 104/115 X |
| 4,355,727 | 10/1982 | Biller | 104/115 X |

*Primary Examiner*—Robert G. Sheridan
*Attorney, Agent, or Firm*—M. Howard Silverstein; David G. McConnell

[57] ABSTRACT

A skyline logging system wherein a skyline cable is supported at an intermediate location by an intermediate support assembly and a logging carriage is supported on the cable and is arranged to pass over the intermediate support assembly. The carriage has inwardly tapered pulleys which ride on oppositely bevelled tracks on the top edges of an upwardly-facing channel shaped member forming part of the intermediate support assembly. The top edges have ramp-like end portions. The carriage is lifted off the cable and rides on the bevelled tracks when crossing over the intermediate support assembly. The carriage can tilt laterally relative to the intermediate support assembly while riding on the bevelled tracks because of the lateral movability of the tapered pulleys on the oppositely bevelled tracks, whereby to maintain stability during passage of the carriage over the intermediate support.

11 Claims, 7 Drawing Figures

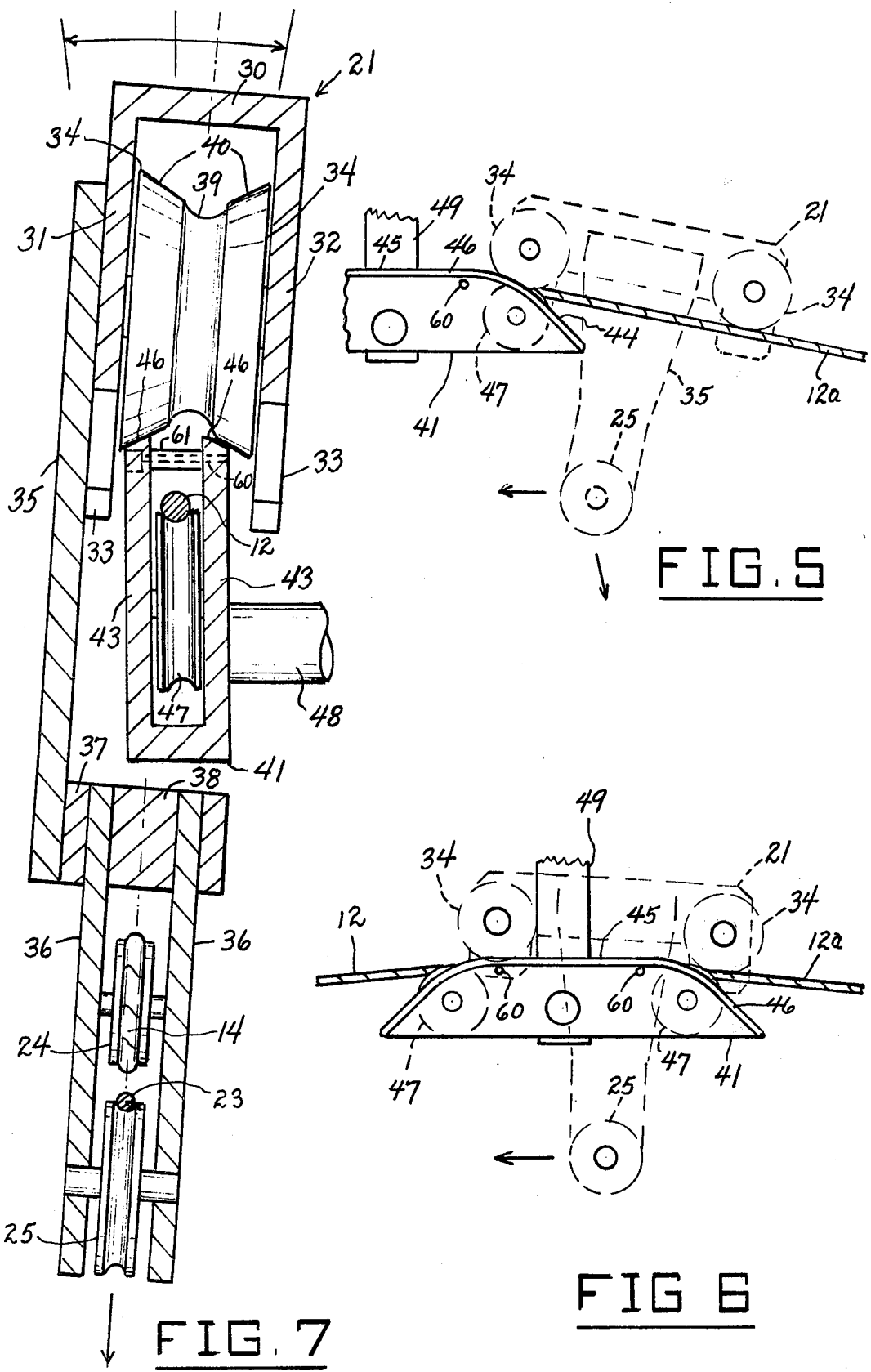

CARRIAGE FOR CABLE LOGGING SYSTEM

REFERENCE TO RELATED APPLICATION

This application is a continuation-in-part of copending application Ser. No. 210,460 entitled "Carriage for Cable Logging System" by the same inventors as the present invention, filed Nov. 25, 1980, now abandoned, and the entire disclosure of which is incorporated herein by reference.

This application is also related to, in the sense that it has some common subject matter, to the three co-pending patent applications as follows:

Ser. No. 102,484 by Joseph W. Gorsh titled "Running Skyline Intermediate Support and Multi-Span Carriage", U.S. Pat. No. 4,347,938;

Ser. No. 115,538 by Cleveland J. Biller titled "Intermediate Support for a Skyline Logging System", U.S. Pat. No. 4,355,727;

Ser. No. 242,513 by Cleveland J. Biller and David D. Johnson titled "Roller Intermediate Support for Cable Logging System", U.S. Pat. No. 4,387,812.

FIELD OF THE INVENTION

This invention relates to skyline logging systems of the type employing a yarder and a skyline attached thereto, with a suspended intermediate support to enable logs attached to a carriage to be moved on the skyline without coming into contact with the ground, and more particularly to improvements in carriages and cooperating intermediate support structure for smoothly transporting logs from the stump area to the landing area.

BACKGROUND OF THE INVENTION

Skyline logging systems are cable logging systems used to harvest timber from hillsides too steep for tractor logging. Skyline logging systems utilize a carriage, similar to a trolley, to yard (move) logs from the location where they are felled to the landing (a location where the logs are concentrated for loading onto trucks). During the in-haul phase of the operation, the logs are carried above ground level. An intermediate support for the skyline may be employed where there is a rise or hump between the yarder and the location from which the logs are transported, to provide the necessary ground clearance.

Logging over an intermediate support has been performed since the early part of the present century. Since its inception it has been used with standing skyline systems. These are systems which operate with the skyline anchored at one end while the other end is held in position with a brake for the entire setting. Once the skyline is laid in the intermediate support and raised into position, it does not move longitudinally in the support. Thus, in the previously employed systems the intermediate support engages a stationary line.

In modern systems, the haulback line is utilized to support both the carriage and the turn of logs. Therefore if an intermediate support is to be employed, it must support the haulback line, which always moves in a direction opposite to that of the carriage. There is a substantial need for an improved carriage and associated intermediate support structure which will sustain a moving line, such as a haulback line moving in a direction opposite to that of the carriage employed in the system, which will allow the carriage to smoothly pass the intermediate support while still providing the required support, even if the carriage tilts or swings transversely while passing, and which will retain the associated fast-moving and undulating cable.

SUMMARY OF THE INVENTION

The carriage and associated support structure of the present invention are adapted for both live and running skyline logging systems where the skyline moves relative to the roller intermediate support device during some phase of the yarding cycle. The purpose of the device of the present invention is to allow the carriage to cross the intermediate support smoothly and allow longitudinal movement of the skyline during some phase of the yarding cycle. In a live skyline logging system, such longitudinal movement normally occurs during the loading and unloading phases. In a running skyline system, such longitudinal movement normally occurs during the hauling phase.

The carriage device of the present invention is arranged to run on two upstanding side plates of a roller intermediate support. Between these two side plates are pulleys which hold the skyline cable and allow for movement of the cable.

When a cable system is used to harvest timber on steep slopes, the limiting factor in the length of span is determined by that point wherein the carriage drags on the ground. Thus, in an effort to increase the length of span, intermediate supports are used to maintain the skyline higher off the ground. The intermediate support is typically suspended between two trees. The skyline engages on top of the intermediate support pulleys while the carriage pulleys roll on the top edges of the side plates of the support.

The carriage may approach and pass over the intermediate support in a tilted or transversely swung position relative to the support, caused by various factors, such as lateral oscillation caused by wind, or the like. Therefore some provision must be made to minimize disengagement of the carriage rollers from the side plates and to minimize shock and vibration as the carriage engages on and passes over the support. In accordance with the present invention this is accomplished by bevelling the top edges of the side plates upwardly and inwardly and employing carriage rollers with frusto-conical upwardly and inwardly bevelled track-engaging tread surfaces located symmetrically on opposite sides of their cable-receiving peripheral grooves, the roller tread surfaces being considerably wider than the bevelled track surfaces so as to allow a substantial degree of lateral sliding action of the carriage rollers relative to the side plates, with depending stop lug means provided on the opposite sides of the carriage engageable with the side plates to retain the carriage engaged on the intermediate support as it passes thereover. The inwardly tapered carriage roller tread surfaces substantially conformably engage on the upwardly and inwardly bevelled top edges of the side plates at their rolling contact areas, preventing lateral rolling of the carriage on the side plates, thereby providing improved stability and allowing more design flexibility in the intermediate support device. This arrangement allows the required longitudinal movement of the cable relative to the support and allows the carriage to move smoothly thereover.

Accordingly, a main object of the invention is to provide improved carriage and cooperating intermediate support structure for a skyline logging system which overcomes the deficiencies and disadvantages of the carriage and support structures heretofore employed.

A further object of the invention is to provide an improved skyline logging carriage which employs pulleys with inwardly tapered frusto-conical tread surfaces which are shaped to smoothly roll on the bevelled top edges of the side plates of a roller intermediate support, the carriage being arranged to permit longitudinal movement of the associated skyline cable with minimum abrasion.

A still further object of the invention is to provide an improved skyline logging carriage and an intermediate support structure cooperating with the carriage to allow smooth passage of the carriage over the support, and to permit such smooth passage even when the carraige is tilted or is in a transversely swung position while moving over the intermediate support.

A still further object of the invention is to provide an improved skyline logging carriage which has limited lateral sliding capability relative to its associated intermediate support and which makes substantially surface-to-surface rolling contact with said support, thereby preventing lateral rolling of the carriage on said intermediate support as it passes thereover, and which allows required longitudinal movement of the associated cable relative to the support with a minimum amount of abrasion.

BRIEF DESCRIPTION OF THE DRAWINGS

Further objects and advantages of the invention will become apparent from the following description and claims, and from the accompanying drawings, wherein:

FIG. 5 is a diagrammatic elevational view showing the logging carriage in a position initially engaging the intermediate support as it begins to move thereover.

FIG. 6 is a diagrammatic elevational view similar to FIG. 5, but showing the carriage as it completes its ascent onto the intermediate support.

FIG. 7 is an enlarged transverse vertical cross-sectional view taken through the carriage and the intermediate support, with the carriage supportingly engaged on the side plates of the support, but in a transversely tilted position relative thereto.

DESCRIPTION OF A PREFERRED EMBODIMENT

Figure 1:
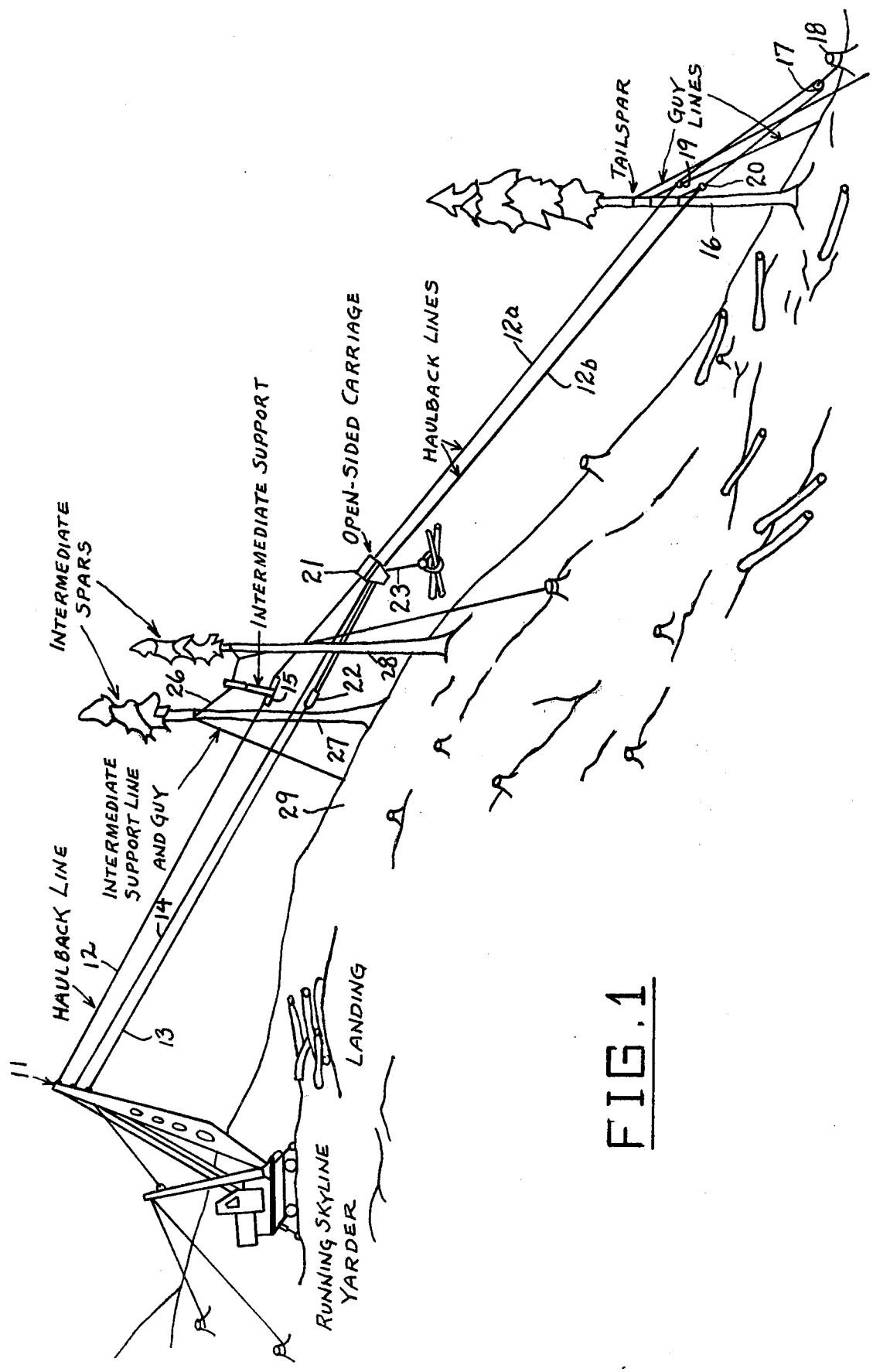
FIG. 1 is a schematic illustration of a typical multi-span skyline logging system employing an improved carriage and associated intermediate support structure according to the present invention.
Figure 2:
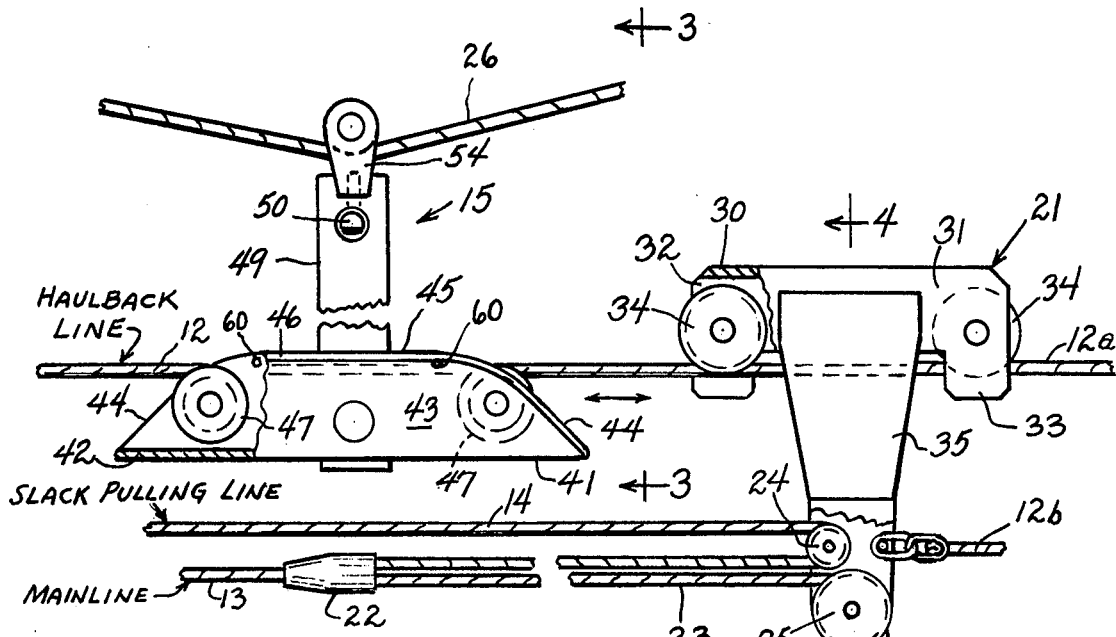
FIG. 2 is a fragmentary side elevational view, partly broken away, of a carriage and associated intermediate support structure according to the present invention, as employed in the skyline logging system of FIG. 1.

Referring to the drawings, FIG. 1 diagrammatically illustrates a typical multi-span, running skyline logging system which employs a conventional yarder 11 with rigging including a haulback line 12, a mainline 13 and a slack pulling line 14. The haulback line 12 extends over an intermediate support assembly 15 located at a suitable position between the yarder 11 and a tailspar tree 16 near the log-felling location. In the illustrated typical system, the haulback line extends around a sheave 17 anchored to a stump 18, the upper and lower haulback line elements 12a and 12b being supported on respective sheaves 19 and 20 connected to the tailspar tree 16. The lower haulback line element 12b is connected to an open-sided carriage 21 movably supported on the upper haulback line element 12a, as will be presently described. The mainline 13 is connected to a junction member 22, to which are respectively connected the slack pulling line 14 and the load supporting line 23. As shown in FIG. 2, the slack pulling line 14 and the load supporting line 23 extend around respective spaced peripherally grooved sheaves 24 and 25 journalled in the lower portion of carriage 21.

The intermediate support assembly 15 may be suspended from a support line and guy cable 26 connected to and supported on a pair of intermediate spar trees 27 and 28 suitably located on opposite sides of the haulback and other rigging lines at the region requiring the extra height of the lines, for example, at a hump or rise 29 between the yarder 11 and the tailspar tree 16.

Figure 4:
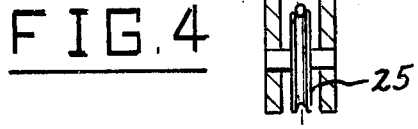
FIG. 4 is an enlarged transverse vertical cross-sectional view taken substantially on line 4—4 of FIG. 2.

Referring to FIGS. 2, 4 and 7, the carriage 21 comprises a downwardly-facing channel-shaped main body having a top wall 30 and parallel depending side walls 31 and 32, said side walls being formed at their end portions with integral depending stop lug elements 33. Journalled between said end portions are respective peripherally grooved supporting pulleys 34, 34 normally supportingly engaged on the upper haulback line element 12a, as shown in FIG. 2.

A depending side plate member 35 is rigidly secured to the intermediate portion of side wall 31. A pair of spaced, parallel depending plate members 36, 36 are rigidly secured to the lower end portion of plate member 35 via spacer blocks 37, 38 dimensioned to provide an inward offset sufficient to make the plane of symmetry between the parallel plate members 36, 36 substantially the same as that of the center plane of the peripheral grooves 39 of pulleys 34, as shown in FIG. 4.

The slack pulling line pulley 24 is journalled between the upper portions of plate members 36, 36 at the left marginal portions of said plate members, as viewed in FIG. 2. The lower haulback line element 12b is connected between the right upper side marginal portions of said plate members, as shown in FIG. 2. The log-supporting pulley 25 is journalled between the lower portions of plate members 36, 36, as shown in FIG. 4.

The peripherally grooved carriage-supporting pulleys 34, 34 are formed with inwardly tapering frusto-conical tread surfaces 40, 40 located symmetrically on opposite sides of the peripheral grooves 39, as shown in FIGS. 4 and 7.

A conventional locking mechanism, not shown, may be employed for at times locking the load-supporting cable 23 relative to the carriage 21.

Figure 3:
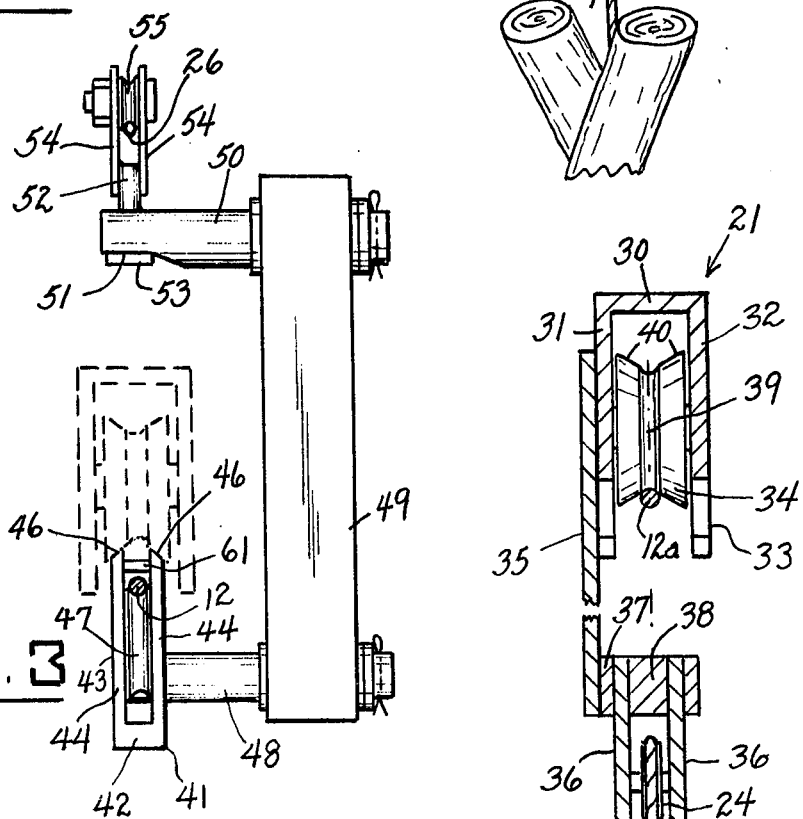
FIG. 3 is an enlarged transverse vertical cross-sectional view taken substantially on line 3—3 of FIG. 2.

The intermediate support assembly 15 comprises an upwardly-facing channel member 41 having a bottom wall 42 and upstanding spaced parallel side walls 43, 43. The channel member 41 is considerably longer than the main body of the carriage 21 and the top edges of the side walls have sloping opposite end ramp portions 44, 44 leading to and arcuately merging with horizontal elongated main intermediate crest portions 45, as viewed in FIG. 2. Said top edges are upwardly and inwardly symmetrically bevelled, as shown at 46, 46, substantially in conformance with the tapering tread surfaces 40, 40 of the rollers 34, 34, as shown in FIGS. 3 and 7. The overall width of the channel member 41 is substantially less than the transverse distance between the pairs of stop lugs 33, 33 of carriage 21 to allow for a substantial degree of angling of the carriage relative to the support body 41, for example, as shown in FIG. 7, such angling being permitted by the engagement of the relatively wide, spaced roller treads 40, 40 with the much narrower spaced bevelled track surfaces 46, 46, as shown in FIG. 7. The opposing bevel angles of the interengaging, substantially conforming transversely spaced sets of surfaces 40, 46 are small enough to allow lateral sliding action between the rollers 34 and track surfaces 46, and this is facilitated by preferably making the roller treads 40 substantially wider than the cooperating bevelled tracks 46.

Journalled between the opposite end portions of the side walls 43, 43 are respective peripherally grooved pulleys 47, 47 on which the haulback line 12 is engaged, as shown in FIG. 2. The pulleys 47, 47 are located so that their top peripheral portions are spaced well below the level of the horizontal elongated crest portions of the track surfaces 46, 46, whereby the cable is receivable between the top marginal portions of side walls 43, 43 sufficiently below said elongated crest portions to allow carriage pulleys 34, 34 to be elevated completely off the cable 12 as the carriage 21 moves over the intermediate support channel member 41.

The channel member 41 is rigidly secured at its mid-portion to a transverse link pivot shaft member 48 which is rotatably secured in the lower end portion of a rectangular link bar 49. The top end of link bar 49 is similarly pivotally connected to a top link shaft 50. As shown in FIG. 3, the top link shaft 50 is parallel to the bottom link shaft 48 and extends perpendicular to the longitudinal vertical central plane of channel member 41. The end portion of said top link shaft is flattened at its bottom, as shown at 51, and has a swivel aperture vertically aligned with channel 41 in which is disposed a swivel bolt 52 having an enlarged head portion 53 received in the recess defined by flat portion 51. The shank of the swivel bolt 52 is welded between a pair of parallel plate-like hanger bar members 54, 54. A supporting sheave pulley 55 is journalled between the upper portions of hanger bar members 54, 54 and is engaged on the intermediate support line 26.

In operation, as the carriage 21 reaches the intermediate support, for example by being moved leftwardly from its position of FIG. 2, it first reaches a position such as that shown in FIG. 5, wherein the left end carriage pulley 34 engages on the right end ramp portion 44 of support channel 41. The carriage 21 is then elevated onto the elongated crest portions 45 as it continues leftwardly to and beyond the position shown in FIG. 6. The carriage thus now becomes disengaged from the haulback line portion 12a, and the haulback line is longitudinally movable freely relative to the carriage 21, thereby minimizing abrasion of the moving cable. As the carriage completes its passage leftwardly over the channel member 41, the carriage rollers 34 again resume weight bearing and rolling contact on the haulback line 12.

FIG. 7 clearly illustrates the elevation of the carriage rollers 34 relative to the haulback line 12 as the rollers engage on the intermediate crest portions 46 of the bevelled top edges of the channel side wall members 43, 43. Said Figure also shows how the carriage 21 may be swung laterally through a substantial angle and still maintain stable bearing contact with the intermediate support main channel body 41 as the carriage passes over the intermediate support. Such swinging action may be caused by oscillation of the load due to wind forces, or other disturbing conditions which may be present at the site.

Between the side walls 43, 43 are respective bolts and bushings 60, 60, 61, 61, above the haulback line 12, as shown in FIG. 3. The bolts and bushings 60, 60, 61, 61 keep the haulback line 12 from flipping off the intermediate support grooved pulleys 47, 47. The bolts and bushings 60, 60, 61, 61 also keep the bevelled side walls 43, 43, from bending and hitting the grooved pulleys 47, 47, when the carriage 35 and load cross the intermediate support.

It will be seen from the above description that the carriage assembly and the cooperating intermediate support structure can be readily adapted for use for both live and running skyline logging systems, including systems wherein the skyline is moved relative to the intermediate support device during some phase of the yarding cycle. In such use, the carriage assembly described herein will pass the intermediate support with very little risk of abrasion of the skyline cable.

In these arts as to running and live skyline systems, as typefied by the upper haulback line 12a, the load carriage, the mainline 13, and the lower haulback line in the present invention and where the carriage rides on the upper haulback line and is driven thereon by the other lines, certain dynamic relationships result. Such systems are often called three cable systems and are characterized by the facts that all three of said lines are maintained under substantially equal tension, and said load carriage rides on the upper haulback line and moves thereon opposite the direction of motion of the upper haulback line itself, and moves at a relative speed of substantially twice the absolute value of the speed of motion of said upper haulback line. Further, the lines connected to the carriage positively drive the carriage in both directions on the upper haulback line.

By way of example; if the upper haulback line is moving upslope at speed X relative to the supports and the ground, then the carriage will move downslope at speed 2X relative to the upper haulback line and at speed X relative to the ground.

This high speed relative motion between the parts of such systems creates problems which are solved by the present invention carriage. These problems include friction at many places, fraying and breaking of lines, jamming, fouling and other problems with the carriage, and the like. The fast moving carriage of the present invention solves all of the problems and smoothly and easily crosses the intermediate support or supports due to its particular configuration and arrangement of parts as described and claimed herein.

These demanding dynamic conditions are present only in these types of three cable systems and are not found in simpler systems such as standing (no motion) support cable systems or tram (closed single loop) types of systems. Thus, the invention is usable in all such systems but is especially applicable to those types of systems wherein the passage of the carriage over or past an intermediate support presents these larger problems. Intermediate supports in trams and standing support types of cable systems are a well developed art and have been successfully used for many years.

While a specific embodiment of an improved logging carriage and intermediate support structure associated therewith have been disclosed in the foregoing description, it will be understood that various modifications within the scope of the invention may occur to those skilled in the art. Therefore it is intended that adaptations and modifications should and are intended to be comprehended within the meaning and range of equilvalents of the disclosed embodiments.

What is claimed is:

1. A logging system comprising yarder means, tailspar means, skyline cable means interconnecting the yarder means and the tailspar means, intermediate support means located between the yarder means and the tailspar means, said intermediate support means comprising an upwardly facing channel shaped member having upstanding side walls provided with support pulley means journalled between said side walls, said side walls extending uniformly from end to end of said channel shaped member, means supporting said channel shaped member substantially parallel with said skyline cable means with the cable means supportingly engaged on said pulley means and received in said channel shaped member, load carriage means provided with carriage pulley means normally supportingly engaged on said skyline cable means and being engageable on the top edges of said side walls, means to elevate the load carriage means and disengage the carriage pulley means from the skyline cable means responsive to the movement of the carriage means over the channel shaped member, wherein the top edges of the side walls of said channel shaped member are upwardly and inwardly bevelled, wherein the carriage pulley means has tread means shaped to substantially conform with the upwardly and inwardly bevelled track surfaces defined by said side wall top edges, wherein said tread means comprises substantially frusto-conical, inwardly tapering pulley peripheral surfaces on the carriage pulley means spaced to engage on the bevelled top edges of said channel shaped member, and wherein said frusto-conical peripheral surfaces are substantially wider than the bevelled track surfaces of said side wall top edges to allow variable angling of the load carriage means relative to said channel shaped member.

2. A logging system comprising yarder means, tailspar means, skyline cable means interconnecting said yarder means and said tailspar means, load carriage means, and at least one intermediate support means located between said yarder means and said tailspar means; said skyline cable means comprising a three cable system for moving said load carriage means between said yarder means and said tailspar means and over all of said at least one intermediate support means; said three cable system comprising an upper haulback line, a mainline and a lower haulback line; means to maintain all three of said upper and lower haulback lines and said mainline under substantially equal tension, means to mount said load carriage means on said upper haulback line so that said load carriage means rides on said upper haulback line and moves thereon opposite the direction of motion of said upper haulback line itself and at substantially twice the absolute value of the speed of motion of said upper haulback line relative to said upper haulback line, means to connect said mainline and said lower haulback line to said load carriage means so as to positively drive said carriage means in both directions on said upper haulback line, means to support said upper haulback line on all of said at least one intermediate support means, each of said at least one intermediate support means comprising an upwardly-facing channel shaped member having upstanding side walls provided with support pulley means journalled between said side walls, said side walls extending uniformly from end to end of said channel-shaped member, means supporting said channel shaped member substantially parallel with said upper haulback line supportingly engaged on said pulley means and received in said channel shaped member, said load carriage means comprising carriage pulley means normally supportingly engaged on said upper haulback line and being engageable on the top edges of said side walls, and means to elevate said load carriage means and disengage said carriage pulley means from said upper haulback line responsive to the movement of said load carriage means over said channel shaped member, whereby said load carriage means can move continuously and pass each of said at least one intermediate support means in its motion between said yarder means and said tailspar means, wherein the top edges of the side walls of said channel shaped member are upwardly and inwardly bevelled, wherein the carriage pulley means has tread means shaped to substantially conform with the upwardly and inwardly bevelled track surfaces defined by said side wall top edges, wherein said tread means comprises substantially frusto-conical, inwardly tapering pulley peripheral surfaces on the carriage pulley means spaced to engage on the bevelled top edges of said channel shaped member, and wherein said frusto-conical peripheral surfaces are substantially wider than the bevelled track surfaces of said side wall top edges to allow variable angling of the load carriage means relative to said channel shaped member.

3. The logging system of claim 1 or 2, wherein said support pulley means is spaced below the level of the top edges of the side walls of the channel shaped member.

4. The logging system of claim 1 or 2 and wherein said support pulley means comprises respective support pulleys journalled between the side walls adjacent the opposite ends of the channel shaped member.

5. The logging system of claim 4, and wherein said support pulleys are spaced below the level of the top edges of said side walls.

6. The logging system of claim 5, and wherein the end portions of said top edges are inclined downwardly to define sloping ramp means at the ends of said side walls engageable by said carriage pulley means.

7. The logging system of claim 1 or 2, and stop means on the load carriage means engageable with the channel shaped member to limit lateral movement of the carriage means relative to the channel shaped member.

8. The logging system of claim 1 or 2, and depending stop lug means on opposite sides of the load carriage means engageable with the channel member to limit the degree of angling of the carriage means relative to the channel member.

9. The logging system of claim 1 or 2 and wherein said load carriage means comprises a substantially channel-shaped, downwardly facing main body portion provided with load-suspension means secured to and depending from one side of said main body portion, and wherein said carriage pulley means comprises respective peripherally grooved carriage pulleys journalled between the opposite end portions of the side walls of said main body portion.

10. The logging system of claim 9, and wherein the side walls of said main body portion are spaced apart by a transverse distance substantially greater than the overall width of said upwardly-facing channel shaped member to permit lateral movement of the load carriage means relative to said upwardly-facing channel shaped member.

11. The logging system of claim 10, and wherein the side walls of said main body portion are formed with depending lug means adjacent said carriage pulleys, said lug means being at times engageable with said upwardly-facing channel member to limit angling of the load carriage means relative to said upwardly-facing channel member when the load carriage means passes over the intermediate support means.

* * * * *